US010552885B2

(12) United States Patent
Zuverink et al.

(10) Patent No.: US 10,552,885 B2
(45) Date of Patent: Feb. 4, 2020

(54) SYSTEMS AND METHODS FOR ACQUIRING STRUCTURED INPUTS IN CUSTOMER INTERACTIONS

(71) Applicant: [24]7.ai, Inc., San Jose, CA (US)

(72) Inventors: David J. Zuverink, Mountain View, CA (US); Ashley Shen, Sunnyvale, CA (US)

(73) Assignee: [24]7.ai, Inc., San Jose, CA (US)

( * ) Notice: Subject to any disclaimer, the term of this patent is extended or adjusted under 35 U.S.C. 154(b) by 786 days.

(21) Appl. No.: 15/065,812

(22) Filed: Mar. 9, 2016

(65) Prior Publication Data

US 2016/0275582 A1    Sep. 22, 2016

Related U.S. Application Data

(60) Provisional application No. 62/134,515, filed on Mar. 17, 2015.

(51) Int. Cl.
G06Q 30/00 (2012.01)
G06Q 30/06 (2012.01)
G06F 3/0484 (2013.01)
G06F 3/0482 (2013.01)

(52) U.S. Cl.
CPC ....... *G06Q 30/0613* (2013.01); *G06F 3/0482* (2013.01); *G06F 3/04842* (2013.01)

(58) Field of Classification Search
CPC .. G06Q 30/0601–0645; G06Q 30/0613; G06F 3/0482
USPC .................................... 705/26.1–27.2, 26.41
See application file for complete search history.

(56) References Cited

U.S. PATENT DOCUMENTS

2007/0274495 A1* 11/2007 Youd .................. H04M 3/5231 379/210.01
2007/0288444 A1    12/2007 Nelken et al.
2008/0015887 A1*  1/2008 Drabek ................. G06Q 30/00 705/26.1

(Continued)

OTHER PUBLICATIONS

UpSellit touts 'virtual chat agent' solution. (2008). Wireless News, Retrieved from https://search.proquest.com/docview/210185585?accountid=14753 (Year: 2008).*

(Continued)

*Primary Examiner* — Abby J Flynn
*Assistant Examiner* — Arielle E Weiner
(74) *Attorney, Agent, or Firm* — Perkins Coie LLP; Michael A. Glenn

(57) ABSTRACT

A computer-implemented method and a system facilitate an acquiring of structured inputs from customers in turn-based online interactions. A UI displayed on a customer device and configured to facilitate a turn-based interaction between a customer and an agent facilitates receipt of a free-form textual input entered by the customer. The free-form textual input is indicative of an assistance desired by the customer from the agent. An interactive form including a plurality of questions is displayed within the UI to enable the customer to provide answers to one or more questions in a pre-defined format. At least one reply to be provided to the customer in response to the free-form textual input is determined based on the answers received from the customer for the one or more questions. The at least one reply is displayed within the UI for facilitating provisioning of the assistance desired by the customer.

34 Claims, 7 Drawing Sheets

(56) References Cited

U.S. PATENT DOCUMENTS

| | | | |
|---|---|---|---|
| 2008/0307040 A1* | 12/2008 | So | G06Q 10/10 709/203 |
| 2010/0070554 A1 | 3/2010 | Richardson et al. | |
| 2012/0151380 A1* | 6/2012 | Bishop | G06Q 10/107 715/752 |
| 2014/0108583 A1 | 4/2014 | Kulkarni et al. | |
| 2014/0122109 A1 | 5/2014 | Ghanbari et al. | |
| 2014/0195621 A1* | 7/2014 | Rao DV | H04L 12/1827 709/206 |
| 2015/0100381 A1* | 4/2015 | Petrie | G06Q 30/0241 705/7.32 |
| 2016/0021512 A1* | 1/2016 | Krallman | G06Q 30/0261 455/456.3 |
| 2016/0099892 A1* | 4/2016 | Palakovich | H04L 51/04 709/206 |

\* cited by examiner

SYSTEMS AND METHODS FOR ACQUIRING STRUCTURED INPUTS IN CUSTOMER INTERACTIONS

CROSS REFERENCE TO RELATED APPLICATIONS

This application claims priority to U.S. provisional patent application Ser. No. 62/134,515, filed Mar. 17, 2015, which is incorporated herein in its entirety by this reference thereto.

TECHNICAL FIELD

The invention generally relates to online customer interactions and more particularly to systems and methods for acquiring structured inputs in online customer interactions.

BACKGROUND

Enterprises typically extend online customer support to their customers to enable the customers to seek answers to their queries, to address their concerns, to make payments and the like.

A typical online customer support facility may include human and/or machine based resources capable of interacting with the customers to provide desired assistance to the customers. In an example scenario, an interactive chat or a similar communication interface may be provisioned to a customer to enable the customer to engage in an interaction with a human agent or a virtual agent of the enterprise.

In some example scenarios, the online customer support facility may provision web forms to the customers or enable open-ended chat interactions of the customers with human and/or virtual agents to assist the customers with their respective needs.

Filling in web forms is typically a unidirectional experience. A customer provides information as requested in the form and usually only receives back a confirmation message or an error message upon submission of the form. The customer has to interpret the confirmation/error message for determining the next course of action, which may be inconvenient for the customer.

Traditional chat interfaces offer the convenience and familiarity of the chat interaction style, but the input for the end user is of open-ended nature. In other words, the input area in current chat interfaces is a form field, which accepts any kind of free-form input. This presents a challenge for both systems and agents attempting to solicit particular types of inputs from the customers. In some example scenarios, a system at the online customer support facility may process the information (for example, an account number of the customer) and determine that the input is not in conformity with the format understood by the system and provide an error message to the customer. The customer is required to decipher the error message and provide the information again in the desired format.

The conventional mechanisms of filling up information in a web form or interacting with a help system in an open-ended chat are therefore limited in their ability to provision seamless and hassle-free assistance to the customer.

Accordingly, there is a need to provide assistance to the customer in an efficient and seamless manner. Moreover, there is a need to acquire structured inputs in turn-based interactions, such as chat interactions, so as to facilitate swift and correct interpretation of customer inputs and thereby effect provisioning of assistance desired by the customer in an efficient manner.

SUMMARY

In an embodiment of the invention, a computer-implemented method for acquiring of structured inputs from customers in turn-based online interactions is disclosed. The method receives, by a processor, a free-form textual input entered by a customer in a user interface (UI) displayed on a customer device. The UI is configured to facilitate a turn-based interaction between the customer and an agent. The free-form textual input is indicative of an assistance desired by the customer from the agent. The method causes, by the processor, a display of an interactive form within the UI subsequent to receiving the free-form textual input from the customer. The interactive form includes a plurality of questions. The interactive form is configured to enable the customer to provide answers to one or more questions from among the plurality of questions in a respective pre-defined format. The method determines, by the processor, at least one reply to be provided to the customer in response to the free-form textual input. The at least one reply is determined based on the answers received from the customer for the one or more questions. The method causes, by the processor, a display of the at least one reply within the UI for facilitating provisioning of the assistance desired by the customer.

In another embodiment of the invention, a system for acquiring of structured inputs from customers in turn-based online interactions includes at least one processor and a memory. The memory stores machine executable instructions therein, that when executed by the at least one processor, causes the system to receive a free-form textual input entered by a customer in a user interface (UI) displayed on a customer device. The UI is configured to facilitate a turn-based interaction between the customer and an agent. The free-form textual input is indicative of an assistance desired by the customer from the agent. The system causes a display of an interactive form within the UI subsequent to receiving the free-form textual input from the customer. The interactive form includes a plurality of questions. The interactive form is configured to enable the customer to provide answers to one or more questions from among the plurality of questions in a respective pre-defined format. The system determines at least one reply to be provided to the customer in response to the free-form textual input. The at least one reply is determined based on the answers received from the customer for the one or more questions. The system causes a display of the at least one reply within the UI for facilitating provisioning of the assistance desired by the customer.

In another embodiment of the invention, a non-transitory computer-readable medium storing a set of instructions that when executed cause a computer to perform a method for acquiring of structured inputs from customers in turn-based online interactions. The method receives a free-form textual input entered by a customer in a user interface (UI) displayed on a customer device. The UI is configured to facilitate a turn-based interaction between the customer and an agent. The free-form textual input is indicative of an assistance desired by the customer from the agent. The method causes a display of an interactive form within the UI subsequent to receiving the free-form textual input from the customer. The interactive form includes a plurality of questions. The interactive form is configured to enable the customer to provide answers to one or more questions from among the plurality of questions in a respective pre-defined format. The method determines at least one reply to be provided to the customer in response to the free-form textual input. The at least one reply is determined based on the answers received from the customer for the one or more questions. The method causes a display of the at least one reply within the UI for facilitating provisioning of the assistance desired by the customer.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
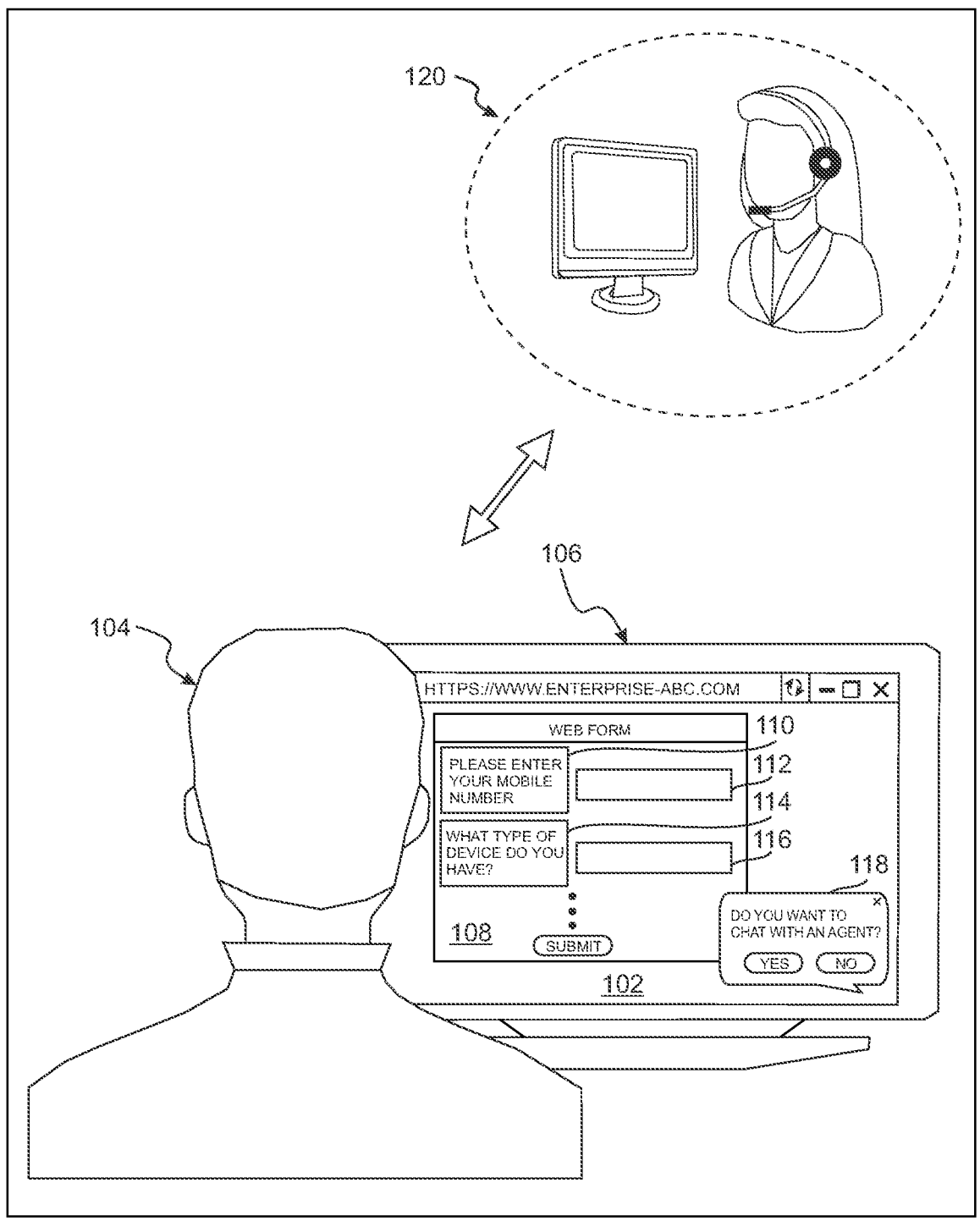
FIG. 1 shows an example user interface (UI) presented to a customer by an enterprise for provisioning online support to the customer, in accordance with an example scenario.

FIG. 1 shows an example user interface (UI) 102 presented to a customer 104 by an enterprise for provisioning online support to the customer 104, in accordance with an example scenario. The term 'enterprise' as used herein may refer to a corporation, an institution, a small/medium sized company or even a brick and mortar entity. For example, the enterprise may be a banking enterprise, an educational institution, a financial trading enterprise, an aviation company, a retail outlet or any such public or private sector enterprise. It is understood that many users may use products, services and/or information offered by the enterprise. The existing and/or potential users of the enterprise offerings are referred to herein as customers of the enterprise. The customers of the enterprise may not be limited to individuals. Indeed, in many example scenarios, groups of individuals or other enterprise entities may also be customers of the enterprise. It is understood that the enterprise may be associated with many such customers, such as the customer 104.

Typically, the customers may wish to interact with an enterprise for a variety of purposes, such as for example, to enquire about billing or payment, to configure a product or troubleshoot an issue related to a product, to enquire about upgrades, to enquire about shipping of a product, to provide feedback, to register a complaint, to follow up about a previous query and the like. In an example scenario, a customer may utilize one or more personal devices to engage in an interaction with a customer support representative (i.e. an agent). Some non-limiting examples of the personal devices may include a desktop computer, a mobile phone, a Smartphone, a laptop, a tablet device, a personal digital assistant, a wearable device such as a Smart watch, and the like. In FIG. 1, the customer 104 is depicted to utilize a personal computer 106 to engage in an online interaction with the enterprise. It is noted that an enterprise customer may utilize interaction channels other than the online/web channel for interacting with enterprise. For example, the enterprise customer may utilize a voice channel, a native mobile application channel, an interactive voice response (IVR) channel, a social media channel etc. for interacting with the enterprise. It is understood that one or more such interaction channels may be accessed using a communication network. Examples of the communication network may include wired networks, wireless networks or a combination thereof. Examples of wired networks may include Ethernet, local area networks (LAN), fiber-optic cable networks and the like. Examples of wireless network may include cellular networks like GSM/3G/4G/CDMA based networks, wireless LANs, Bluetooth or Zigbee networks and the like. An example of a combination of wired and wireless networks may include the Internet. It is noted that in some cases, the customers may preclude interaction with an enterprise over interaction channels and may instead engage in a face-to-face interaction with an agent of the enterprise such as for example, with a sales representative deployed in a retail outlet, etc.

In an illustrative scenario, the customer 104 may access an enterprise website for seeking online assistance and may select a 'Help' icon or an 'Online Support' button displayed on the enterprise website. In an example scenario, the customer 104 may be directed to a UI, such as the UI 102, upon selecting the 'Help' icon or the 'Online Support' button. The UI 102 is depicted to display a web form 108 to the customer 104. The web form 108 is depicted to include a plurality of questions. Further, each question is associated with a form field capable of receiving textual input from the customer 104 as an answer to the question. For example, the web form 108 is depicted to display a question 110 stating 'Please enter your mobile number' to the customer 104. The question 110 is associated with a form field 112 capable of receiving a numeric input from the customer 104 as the customer's phone number. Further, the web form 108 is depicted to display another question 114 stating 'What type of device do you have?' to the customer 104. The question 114 is associated with a form field 116 capable of receiving a textual input as an answer to the question 112 from the customer 104. It is noted that the responses of the customer 104, for example, a response to the question 110 and a response to the question 114 are open-ended responses.

In many example scenarios, the customer 104 may not provide the response in a desired format. For example, if a desired format of the mobile number of a customer is '+1 xxx-xxx-xxxx' (where x denotes a single numeric value), and due to an open-ended nature of the interaction, the customer 104 is not aware of the format, then the customer 104 may input the mobile number in any different format. In some example scenarios, a system at the online customer support facility may process the information (for example, the mobile number) provided by the customer 104 and determine that the provided mobile number is not in conformity with the format understood by the system and provide an error message to the customer 104. The customer 104 is required to decipher the error message and provide the information again in desired format, which may be inconvenient for the customer 104.

In some example scenarios, the customer 104 may be presented with a clickable widget, such as widget 118, on the enterprise website. The widget 118 may be configured to initiate a chat interaction of the customer 104 with a live agent, such as a live agent 120. Upon clicking on the widget 118, a chat console may be displayed on the enterprise website to enable a chat interaction between the live agent 120 and the customer 104. Typically, the chat console may include an input area capable of receiving open-ended textual entries from the customer 104. The open-ended textual entries may be difficult to comprehend for the live agent 120 or may not be in a format desired by systems configured to facilitate agent interpretation of the textual entries. As such, the conventional mechanisms of filling up information in a web form, such as the web form 108, or interacting with live/virtual agents, such as the live agent 120, in an open-ended chat are limited in their ability to provision seamless and hassle-free assistance to the customer 104.

Various embodiments of the present technology disclose systems and methods that are capable of overcoming these and other obstacles and providing additional benefits. More specifically, the systems and the methods disclosed herein cause the customers to provide structured inputs in turn-based online interactions, such as chat interactions, so as to facilitate swift and correct interpretation of customer inputs and thereby effect provisioning of assistance desired by the customer in an efficient manner. An example system configured to facilitate an acquiring of structured inputs from customers in turn-based online interactions is explained with reference to FIG. 2.

Figure 2:
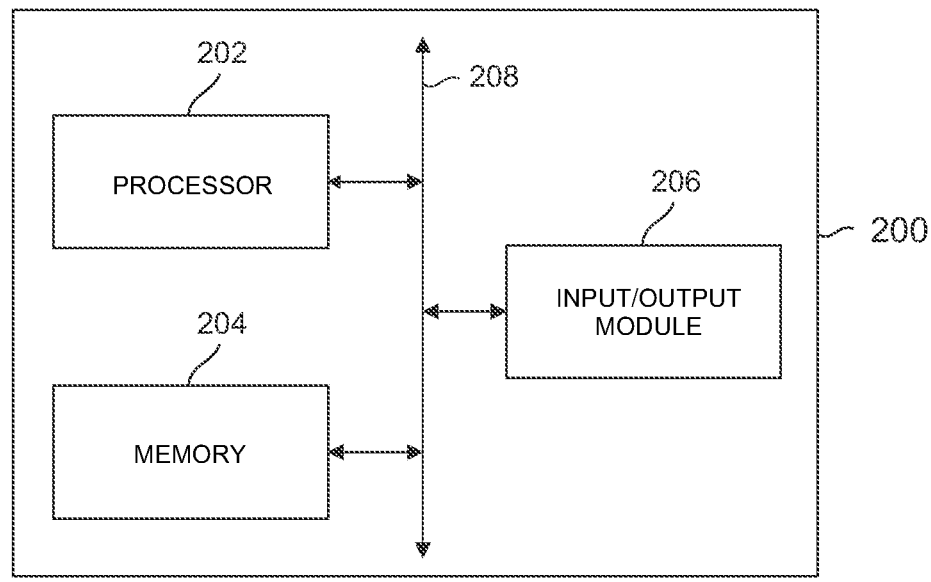
FIG. 2 is a block diagram of a system configured to facilitate an acquiring of structured inputs from customers in turn-based online interactions, in accordance with an embodiment of the invention.

FIG. 2 is a block diagram of a system 200 configured to facilitate an acquiring of structured inputs from customers in turn-based online interactions, in accordance with an embodiment of the invention. The term 'customers' as used herein may refer to both existing and potential users of products, services or information offered by an enterprise. Moreover, the term 'customers' of the enterprise may include individuals, groups of individuals, other organizational entities etc. As explained with reference to FIG. 1, the term 'enterprise' may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise.

The term 'structured inputs' as used herein refers to inputs (or textual entries) from customers in a format desired by the agent or the entity entrusted with interpreting the customer's input, such as the system 200. The term 'turn-based online interactions' as used herein refers to interactive online conversations, such as chat conversations, where the participants take turns to converse during the interaction. More specifically, the term 'turn-based interaction' may refer to any kind of communication over the Internet or other possible network connections, but is primarily meant to refer to direct one-on-one chat or text-based group chat (also known as synchronous conferencing), using tools such as Instant Messengers (IM), Internet Relay Chat (IRC), Multi-user Dimensions (MUDs) and the like. Therefore, the term 'acquiring structured input in turn-based online interactions' as used herein refers to causing the customer to provision chat entries in a format desired by the agent and/or the system 200 so as to enable seamless and hassle-free provision of assistance to the customer.

The term 'agents' as used hereinafter may refer to human or virtual agents engaged in customer support and service related activities. Moreover, the term 'customer support facility' used throughout the description refers to an 'online customer support facility' unless the context suggests otherwise.

The system 200 includes at least one processor, such as a processor 202 and a memory 204. It is noted that although the system 200 is depicted to include only one processor, the system 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The system 200 also includes an input/output module 206 (hereinafter referred to as 'I/O module 206') for providing an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to enable enterprises to utilize the system 200 for facilitating acquisition of structured inputs from customers in online turn-based interactions. Furthermore, the I/O module 206 may be integrated with a monitoring mechanism configured to provide the enterprises with real-time updates/alerts (for example, email notifications, SMS alerts, etc.) of changes to be made to the system 200 for facilitating acquisition of structured inputs from customers in online turn-based interactions.

In an embodiment, the I/O module 206 may include one or more transceivers configured to facilitate to and fro communication with remote web servers. In some embodiments, the remote web servers may be configured to track customer activity on enterprise websites. For example, the web servers may be configured to track website access by customers by way of tracking cookies (for example, web browser cookies) and/or tags, such as hypertext markup language (HTML) tags or JavaScript tags associated with the web pages of the website. In some cases, the web servers may also be capable of opening up a socket connection for an on-going customer journey on the website to capture data related to customer activity on the website. For example, the web servers may capture a customer action, such as request for an interaction with an agent (for example, by clicking on a 'Help' widget or a 'Contact Customer Support' button displayed on the website). The I/O module 206 may be configured to receive information captured in such a manner from the remote web servers.

The remote web servers may also be configured to be communicably associated with devices associated with the agents, such that the remote web servers may receive information related to agent interactions with customers in substantially real-time. For example, the remote web servers may be configured to track an on-going chat interaction or a voice interaction between an agent and a customer and provision such information to the I/O module 206.

The I/O module 206 may further be configured to effect display of various user interfaces on remote devices. The remote devices may be customer-owned or customer-associated devices. In at least one example embodiment, the I/O module 206 may be configured to be in communication with device application programming interfaces (APIs) so as to push content such as chat console UIs and receive customer response from the remote devices.

In an embodiment, various components of the system 200, such as the processor 202, the memory 204 and the I/O module 206 are configured to communicate with each other via or through a centralized circuit system 208. The centralized circuit system 208 may be various devices configured to, among other things, provide or enable communication between the components (202-206) of the system 200. In certain embodiments, the centralized circuit system 208 may be a central printed circuit board (PCB) such as a motherboard, a main board, a system board, or a logic board. The centralized circuit system 208 may also, or alternatively, include other printed circuit assemblies (PCAs) or communication channel media.

It is understood that the system 200 as illustrated and hereinafter described is merely illustrative of a system that could benefit from embodiments of the invention and, therefore, should not be taken to limit the scope of the invention. It is noted that the system 200 may include fewer or more components than those depicted in FIG. 2. In an embodiment, the system 200 may be implemented as a platform including a mix of existing open systems, proprietary systems and third party systems. In another embodiment, the system 200 may be implemented completely as a platform including a set of software layers on top of existing hardware systems. In an exemplary scenario, the system 200 may be any machine capable of executing a set of instructions (sequential and/or otherwise) so as to facilitate acquisition of structured inputs from customers in turn-based online interactions. Moreover, the system 200 may be implemented as a centralized system, or, alternatively, the various components of the system 200 may be deployed in a distributed manner while being operatively coupled to each other. In an embodiment, functionalities of the system 200 may also be embodied as a client within devices, such as agent devices. In another embodiment, the system 200 may be a central system that is shared by or accessible to each of such devices.

The acquisition of structured inputs from customers in turn-based online interactions is explained hereinafter with reference to one customer seeking assistance from customer support offered by an enterprise. It is understood that structured inputs may similarly be acquired from various customers during their respective turn-based online interactions.

In an example scenario, a customer may access an enterprise website and click on a 'Help' icon or an 'Online Customer Support' button displayed on the enterprise website to initiate an interaction with an agent. In some scenarios, a floating widget may also be displayed on each web page of the enterprise website requesting the customer to click on a widget if they wish to interact with an agent of the enterprise for desired assistance. As explained with reference to FIG. 1, customers of the enterprise may desire assistance for various reasons, such as for example to enquire about billing or payment, to configure a product or troubleshoot an issue related to a product, to enquire about upgrades, to enquire about shipping of a product, to register a complaint etc.

In an example scenario, a user interface (UI) may be displayed to the customer on the enterprise website if the customer requests an interaction with an agent by clicking on the 'Help' icon or the 'Online Customer Support' button (or by clicking on a widget, such as the widget 118 explained with reference to FIG. 1). The UI displayed to the customer may be configured to facilitate a turn-based interaction between the customer and an agent. For example, the UI corresponds to a chat console UI configured to facilitate a chat interaction between the customer and the agent.

In an embodiment, the processor 202 is configured to, with the content of the memory 204, cause the system 200 to display a form field within the UI, which is capable of receiving a text entry corresponding to identification information from the customer. Moreover, the form field is configured to display a desired text entry format to the customer for assisting the customer to provide the text entry conforming to the desired text entry format. An example form field displayed by the system 200 to the customer is depicted in FIG. 3A.

Figure 3A:
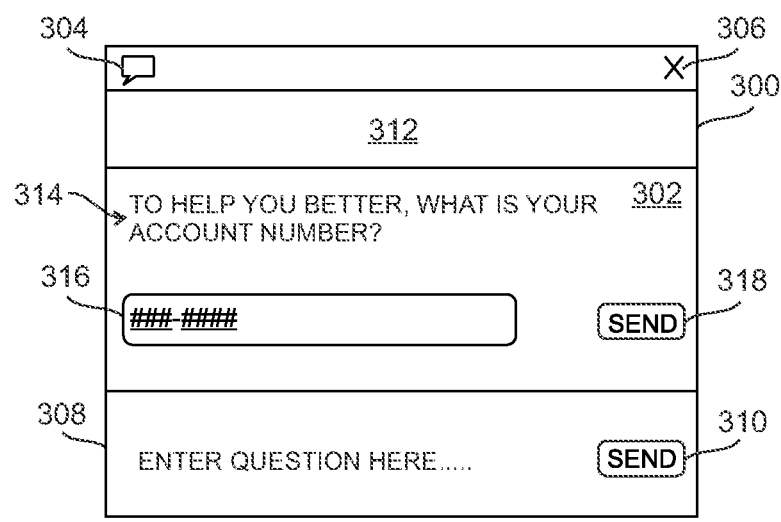
FIG. 3A shows an example screenshot of a chat console displaying a UI including a form field presented to a customer upon receiving the customer's request for chat assistance, in accordance with an embodiment of the invention.

Referring now to FIG. 3A, an example screenshot of a chat console 300 displaying a UI 302 including a form field presented to a customer upon receiving the customer's request for chat assistance is shown, in accordance with an embodiment of the invention. It is understood that in at least one example embodiment, the chat console 300 may be displayed on a display screen of a customer device. Some non-limiting examples of the customer device may include a personal computer, a laptop, a Smartphone, a mobile phone, a tablet computer, a wearable device, a personal digital assistant and the like.

In one embodiment, the chat console 300 may be displayed by the system 200 in a minimized form on an enterprise website and the chat console 300 may be configured to assume a maximized form displaying the UI 302 upon receiving a customer input, such as a click on the minimized form of the chat console 300 indicative of the customer's desire to seek assistance from an enterprise agent. It is noted that FIG. 3A depicts a representation of the chat console 300 for illustration purposes and that the chat console 300 for facilitating interaction between the customer and the agent may not be limited to the illustration depicted in FIG. 3A. Indeed, many example text-based interaction platforms, such as instant messengers, relay chats, etc. may be used for facilitating chat interaction between the customer and the agent.

The chat console 300 is depicted to include a chat icon 304 indicative of an ongoing chat, an end chat option 306 capable of terminating the chat interaction and a text entry section 308 capable of receiving textual input from the customer. The text entry section 308 is further associated with a send button 310 indicative of customer confirmation of completion of text entry into the text entry section 308. In an example embodiment, the chat console 300 further displays a banner section 312, which may be configured to display a name and/or photo of an agent along with identifiers such as enterprise logo and the like.

The UI 302 is depicted to display an interaction question 314 stating 'To help you better, what is your account number?' to the customer. In an example scenario, the account number may be a unique combination of digits that the customer may have received at a time of registration with the enterprise associated with the website and/or with the customer support facility. In an embodiment, the system 200 may function as a virtual assistant or cause a virtual agent (such as for example, a chatbot) disposed at a remote location to provision the interaction question 314 to the customer.

The interaction question 314 is depicted to be associated with a form field 316 capable of receiving textual input from the customer. In an embodiment, the system 200 may further be configured to display an example format of the account number to be entered into the form field 316. As an illustrative example, FIG. 3A depicts the desired format of the account number to be '###-####' in the form field 316. In an embodiment, the format of the account number being displayed in the form field 316 enables the customer to enter the account number correctly such that the virtual agent and/or the system 200 receives the customer information in the format desired by the customer support facility.

The form field 316 is displayed along with a send option 318. The customer may choose to enter the account number in a format as displayed in the form field 316 and submit the account number by selecting the send option 318. Such a receipt of the structured input enables easy parsing or processing of the input. In an embodiment, the account number provided by the customer may be used to identify the customer. The identification of the customer may enable retrieval of customer related data stored in a customer relationship management (CRM) database in the memory 204 of the system 200. Some non-limiting examples of the customer related data stored in the CRM database include information, such as age/gender of the customer, browsing history of the customer, past interactions of the customer with agents, and the like.

The customer may also choose to ignore answering the interaction question 314 (by not entering the account number) and may instead directly enter a question in the text entry section 308, exemplarily displaying text 'Enter your question here', and submit the question by selecting the send button 310.

In an embodiment, the customer may provide the account number in the form field 316 and select the send option 318 to submit the account number. In an embodiment, the system 200 of FIG. 2 may be caused to dynamically present an appropriate next question to the customer as exemplarily depicted in FIG. 3B.

Figure 3B:
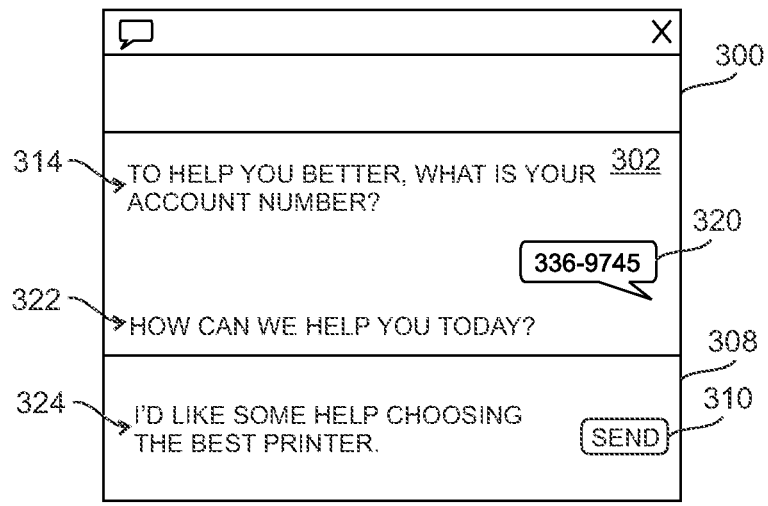
FIG. 3B shows an example screenshot of the chat console of FIG. 3A displaying an ongoing interaction with the customer on the UI of the chat console, in accordance with an embodiment of the invention.

Referring now to FIG. 3B, an example screenshot of the chat console 300 of FIG. 3A displaying an ongoing interaction with the customer on the UI 302 is shown, in accordance with an embodiment of the invention. As explained with reference to FIG. 3A, the customer may provide his account number (exemplarily depicted to be 336-9745) and select the send option 318 to submit the account number. Thereafter, the account number may be displayed in a bubble form as depicted by a chat entry 320 in the UI 302 depicted in FIG. 3B. Upon receiving the account number, the system 200 may cause, either directly or through a virtual agent, a display of an interaction question 322 eliciting an open-ended or a free-form response from the customer. In FIG. 3B, the interaction question 322 is depicted to be 'How can we help you today?'

The customer may enter a free-form textual input 324 in the text entry section 308 of the chat console 300 to provide a response to the interaction question 322. As an illustrative example, the free-form textual input 324 provided by the customer in response to the interaction question 322 is depicted to be 'I'd like some help choosing the best printer'. The customer may further submit the free-form textual input 324 by selecting the send button 310.

Referring now to FIG. 2, in an embodiment, the processor 202 is configured to, with the content of the memory 204, cause the system 200 to receive the free-form textual input, such as the free-form textual input 324 entered by a customer in a UI, such as the UI 302, displayed on the customer device. The free-form textual input 324 is indicative of an assistance desired by the customer from the agent. More specifically, the customer seeks assistance from the agent in choosing a suitable printer for his or her needs.

In at least one example embodiment, the processor 202 is configured to, with the content of the memory 204, cause the system 200 to extract feature vectors by parsing and analyzing the free-form textual input 324. In an embodiment, the extraction of feature vectors (also referred to herein as 'features') is performed using statistical techniques. In at least one embodiment, the system 200 is configured to extract one or more features from the free-form textual input 324 and associate intents with the extracted features. An example of a feature is:

WORD (choose) NEAR WORD (printer) WITHIN_DISTANCE (2), which implies choosing a printer. Accordingly, the feature 'choose printer' may be tagged with the intent of choosing a printer. The system 200 may be caused to identify one or more intents and tag the intents to the corresponding features extracted from the free-form textual input 324.

In some embodiments, the system 200 may be caused to compute a probability score for each intent. As explained with reference to FIG. 3A, the system 200 is caused to identify the customer using the account number and retrieve information related to the customer, such as for example, information such as age/gender of the customer, browsing history, past interaction information, etc. from the CRM database. In at least one embodiment, the retrieved information may be used to compute a probability score for each intent. For example, a probability score A of a customer intent based upon the feature vector of the text may be computed using equation (1):

$$A = p(I_i|X) \quad (1)$$

where $I_i$ is the $i^{th}$ intent I and X is the feature vector. In at least one example embodiment, the system 200 is configured to use machine-learning algorithms, such as Hidden Markov's Model (HMM) or Conditional Random Fields (CRF), to compute the probability of intent $I_i$ based on the customer historical behavior. In at least one example embodiment, the system 200 may be caused to rank the intents in the order of the probability scores and thereafter compare the probability score of the maximum scoring intent with a pre-defined threshold value (for example, a '0.9' value indicative of a 90% probability of occurrence of an event). If the probability score of the maximum scoring intent is greater than the pre-defined threshold value, then the system 200 may be caused to customize further interaction with the customer based on the intent. However, if the probability score of the maximum scoring intent is less than or equal to the pre-defined threshold value, then the system 200 may be caused to preclude customization of subsequent interaction and conduct the subsequent interaction so as to learn more about the assistance desired by the customer.

In an embodiment, the processor 202 is configured to, with the content of the memory 204, cause the system 200 to display an interactive form within the UI. More specifically, in order to assist the customer based on the assistance requested by the customer, the system 200 may be caused to display an interactive form including a plurality of questions. In at least one example embodiment, the interactive form and the questions therein may be selected based on the parsing and subsequent analysis of the free-from textual input to identify intent of the customer. The interactive form is configured to enable the customer to provide answers to one or more questions from among the plurality of questions in a respective pre-defined format. More specifically, the interactive form is designed to elicit structured inputs from the customer. The structured inputs from the customer may then be utilized by the system 200 to accurately understand the customer's requirements and make suitable recommendations to the customer in order to assist the customer with his or her respective needs.

In an example embodiment, the plurality of questions associated with the interactive form is displayed to the customer one-question at a time on the UI. Further, a next question is displayed on the UI based on the customer's answer to a question being currently displayed on the UI. In an example embodiment, each question is associated with multiple answer options. In an embodiment, the selection of an answer option enables the customer to provide an answer to a corresponding question in the respective pre-defined format. For example, if a question relates to a type of a device that the customer has, and if the customer is using a Smartphone then in an open-ended chat scenario, the customer may provide answers, such as for example, a mobile device, a phone, a cellular phone, an Android phone, etc. As such, the same question may be answered in multiple correct ways. However, if the customer is provided with multiple answer options, such as for example, 'a phone', 'a personal computer' and 'a tablet computer', then in such a scenario, the customer may select the 'phone' answer option and provide the answer in the pre-defined format for this question to the system 200. It is noted that each question of the interactive form may similarly be associated with a pre-defined format. For example, a question requesting a mobile number, a credit card expiry information, a flight ticket number, etc., may have respective formats, whereas a question requesting the customer to provide a data of purchase may have its own pre-defined format, for example, 18 May 2010. It is understood that the system 200 may pre-define formats of answers for each question based on the historical data or on statistical analysis indicative of the most convenient manner of provisioning answers for that question. Accordingly, the system 200 may configure multiple answer options for each question and a customer selection of one answer option enables the customer to provide answer in a structured form desired by the system 200.

In an example embodiment, the multiple answer options configure a drop-down list. In another example embodiment, each answer option from among the multiple answer options is associated with a radio button capable of being selected by the customer to indicate a choice of the answer option as the answer to the corresponding question. The display of the interactive form displaying questions, one-question at a time, is further explained with reference to FIGS. 3C to 3F.

Figure 3C:
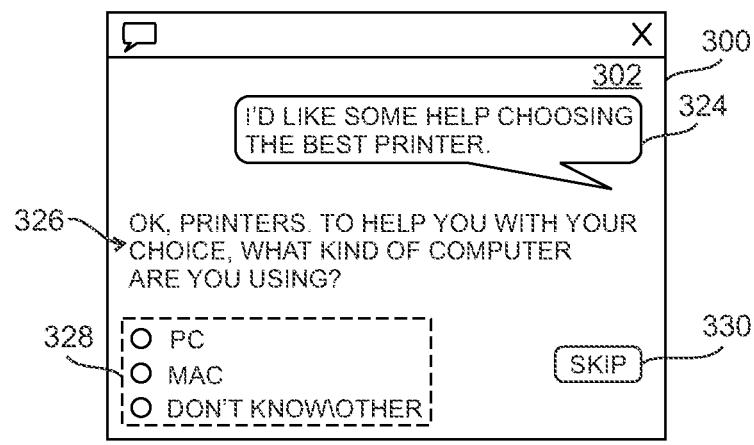
FIG. 3C shows an example screenshot of the chat console of FIG. 3A for illustrating a question corresponding to an interactive form being displayed to the customer, in accordance with an embodiment of the invention.

Referring now to FIG. 3C, an example screenshot of the chat console 300 of FIG. 3A is shown for illustrating a question corresponding to an interactive form being displayed to the customer, in accordance with an embodiment of the invention. The UI 302 of the chat console 300 as depicted in FIG. 3C presents the customer with the view in which he/she can see details of the currently ongoing turn-based interaction and which is continued from FIG. 3B.

As explained with reference to FIG. 3B, the customer provides a free-form textual input 324 in response to the interaction question 322. The free-form textual input 324 is indicative of the assistance desired by the customer. In an illustrative example, the customer seeks assistance in choosing a suitable printer. Further as explained with reference to FIG. 2, the system 200 may be caused to receive the free-form textual input 324 and cause a display of an interactive form including questions, which are displayed one-question at a time and are associated with multiple answer options. More specifically, the system 200 is caused to parse the text of the free-form textual input 324 to understand (or determine) customer intent and accordingly cause to display an interactive form showing an appropriate next question. Accordingly, the UI 302 depicts only one question 326 of the interactive form along with multiple answer options 328 to the customer on the UI 302. The text corresponding to the question 326 is exemplarily depicted to include 'Ok, printers. To help you with your choice, what kind of computer are you using?'. The multiple answer options 328 displayed to the customer include options to select one of 'Mac' (i.e. an Apple Macintosh computer), 'PC' (i.e. a Microsoft Windows Machine) or a 'Don't know/Other' option as an answer to the question 326. Each answer is associated with a radio button capable of being selected by the customer to indicate his or her choice of an answer to the question 326.

It is noted that though the question 326 and the multiple answer options 328 are depicted to be provided inline, the provisioning of such questions and respective multiple answer options may not be limited to the formats depicted herein. Indeed, in many example scenarios, the questions and/or respective multiple answer options of the interactive form may be slided out and displayed adjacent to the UI 302. In an embodiment, the customer may also choose to skip answering of the question 326 by selecting (or clicking on) the 'Skip' button 330 provided adjacent to the multiple answer options 328. In an illustrative example, the customer may choose 'Mac' as the answer option from among the multiple answer options 328 by selecting the respective radio button. Such a selection is depicted in FIG. 3D.

Figure 3D:
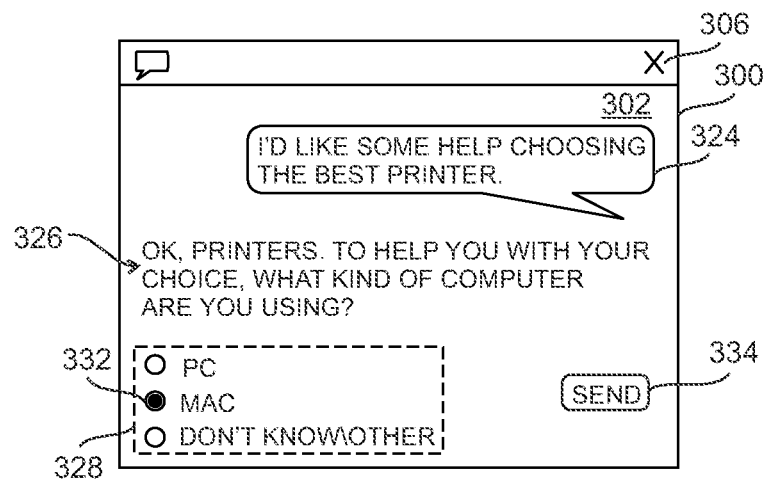
FIG. 3D shows an example screenshot of the chat console of FIG. 3A for illustrating a selection of an answer option by the customer in response to the question of the interactive form, in accordance with an embodiment of the invention.

Referring now to FIG. 3D, an example screenshot of the chat console 300 of FIG. 3A is shown for illustrating selection of an answer option by the customer in response to the question of the interactive form, in accordance with an embodiment of the invention. As explained with reference to FIG. 3A, an appropriate question may be selected by the system 200 based on the free-form textual input 324 provided by the customer indicating his or her desired assistance. The system 200 may further be caused to display the appropriate question, such as the question 326 as a part of an interactive form on the UI 302. Moreover, the question 326 is associated with the multiple answer options 328 and the customer may select an appropriate answer option 332 (exemplarily depicted to be 'Mac') as depicted in FIG. 3D. The customer may subsequently submit the selected answer option 332 by selecting a send option 334, which may appear upon selection of the radio button corresponding to the 'Mac' answer option 332.

Figure 3E:
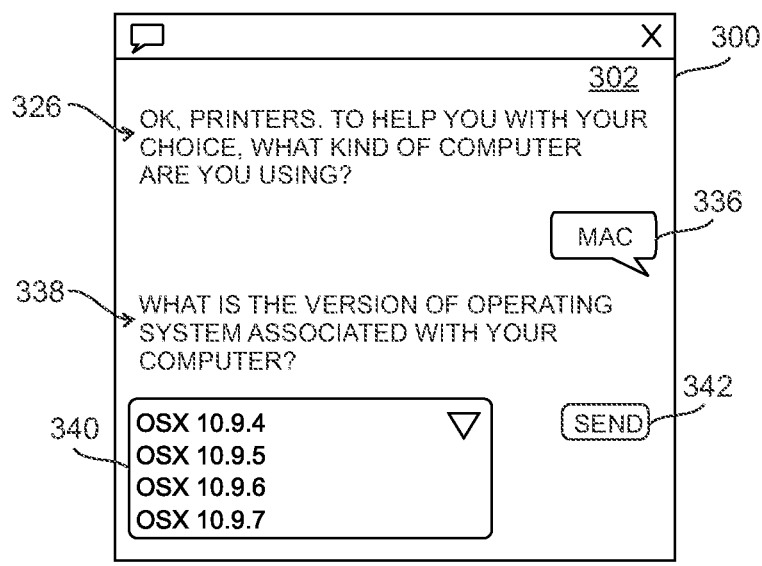
FIG. 3E shows an example screenshot of the chat console of FIG. 3A for illustrating a next question of the interactive form being displayed to the customer, in accordance with an embodiment of the invention.

Referring now to FIG. 3E, an example screenshot of the chat console 300 of FIG. 3A is shown for illustrating a next question of the interactive form being displayed to the customer, in accordance with an embodiment of the invention. The UI 302 of the chat console 300 as depicted in FIG. 3E presents the customer with the view in which he/she can see details of the currently ongoing turn-based interaction and which is continued from FIG. 3D.

As explained with reference to FIG. 3D, the customer selects the answer option 332 (i.e. the 'Mac' answer option) in response to the question 326 and submits the selected answer option 332 using the send option 334. In an example embodiment, the selected answer option 332, post submission, is depicted as text in a bubble form as depicted by a chat entry 336.

In an example embodiment, the system 200 is caused to receive the answer selected by the customer and cause a display of another question as a part of the interactive form on the UI 302 of the chat console 300. Accordingly, the system 200 is depicted to cause a display of a next question 338 of the interactive form along with multiple answer options 340 on the UI 302.

The text corresponding to the question 338 is exemplarily depicted to include 'What is the version of operating system associated with your computer?'. Further, the multiple answer options 340 displayed to the customer include options to select one operating system version for the 'Mac' computer from among 'OSX 10.9.4', 'OSX 10.9.5', 'OSX 10.9.6', and 'OSX 10.9.7' as an answer to the question 338. In an illustrative example, the multiple answer options 340 configure a drop down list and the customer may select one answer option from the drop down list to indicate his or her choice of an answer to the question 338.

It is noted that though the question 338 and the multiple answer options 340 are depicted to be provided inline, the provisioning of such questions and respective multiple answer options may not be limited to the formats depicted herein. Indeed, in many example scenarios, the questions and/or respective multiple answer options of the interactive form may be slided out and displayed adjacent to the UI 302. In an embodiment, the customer may choose the answer option OSX 10.9.4 from the drop down list and select a send option 342 to submit the selected answer option as the answer to the question. Such a selection is depicted in FIG. 3F.

Referring back to FIG. 2, in an embodiment, the processor 202 is configured to, with the content of the memory 204, cause the system 200 to determine at least one reply to be provided to the customer in response to the free-form textual input determined based on the answers received from the customer for the one or more questions. More specifically, based on the free-form textual input, such as the textual input 324 of the customer requesting help for choosing a printer, the system 200 may be caused to configure an interactive form including questions and respective answer options that are related to determining customer requirements in further detail. From the illustrative example explained with reference to FIGS. 3C to 3E, it is learnt that the customer possesses a Macintosh computer with an operating system of OSX 10.9.4. Accordingly, the system 200 may determine that the 'best printer' desired by the customer must be compatible with a Macintosh computer and an OSX 10.9.4 operating system. Given, such a requirement, the system 200 may be caused to conduct a search of printers on content databases to identify printers which meet such a requirement and then identify content, which may help the customer to choose one printer from among many printer options that are compatible with the Macintosh computer and the OSX 10.9.4 operating system. For example, a web link of a web page displaying feature and cost wise comparison between printers from different enterprises may be identified as a relevant reply to the customer's need.

In an embodiment, the processor 202 is configured to, with the content of the memory 204, cause the system 200 to display the reply within the UI (such as the UI 302) for facilitating provisioning of the assistance desired by the customer. Such a scenario is explained with reference to FIG. 3F.

Figure 3F:
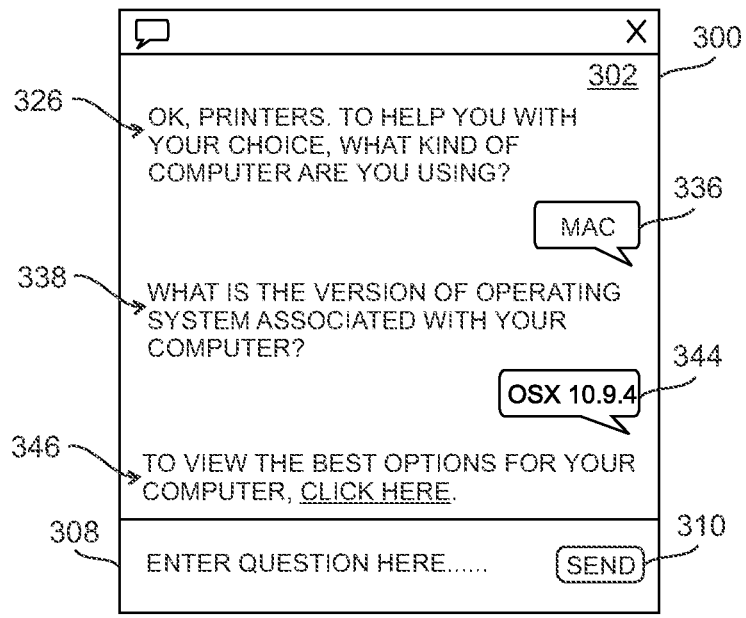
FIG. 3F shows an example screenshot of the chat console of FIG. 3A is shown for illustrating a provisioning of a reply to the customer based on the answers of the customer to one or more questions of the interactive form, in accordance with an embodiment of the invention.

Referring now to FIG. 3F, an example screenshot of the chat console 300 of FIG. 3A is shown for illustrating a provisioning of a reply to the customer based on the answers of the customer to one or more questions of the interactive form, in accordance with an embodiment of the invention. As explained with reference to FIG. 3E, the customer chooses an answer option 'OSX 10.9.4' in reply to the question 338. In an example embodiment the selected answer option, post submission, is depicted as text in a bubble form as depicted by a chat entry 344 in the UI 302.

It is understood that the questions, such as the questions 326 and 338, depicted in FIGS. 3B and 3D, respectively, form only a part of the interactive form, and, in at least one example embodiment, the system 200 may be caused to provision several questions, one-question at a time, and associated with multiple answer options as explained above. Further, upon receiving answers for one or more questions of the interactive form, the system 200 may be caused to display of a reply, such as a reply 346, on the UI. More specifically, the reply 346 may include text 'To view the best options for your computer, click here'. The portion 'click here' may be configured as a hyperlink and, which if selected by the customer, may cause opening of a new webpage with links to all compatible printers for the Mac computer with the OSX 10.9.4 operating system. Further, a comparison chart for costs and features may also be provisioned to the customer on the new web page so as to assist the customer in choosing the best printer as per his or her requirement.

In an embodiment, the customer may also choose to ignore selecting the 'click here' link in the reply 346 and may instead choose to chat with the virtual assistant by entering another question in the text entry section 308 and submit the question by selecting the send option 310.

In some embodiments, the system 200, either directly or by causing a virtual agent to interact with the customer, by means of the interactive form, receive information regarding the customer's requirement, till a live agent is available for interacting with the agent. In such a scenario, the reply provided to the customer may include a text entry informing the customer of a subsequent involvement of a live agent in assisting the customer with the desired assistance. In such a scenario, the interactive form is configured to present indications of an amount of time remaining for the live agent to be available for interacting with the customer at regular intervals as will be explained with reference to FIGS. 4A to 4C.

Figure 4A:
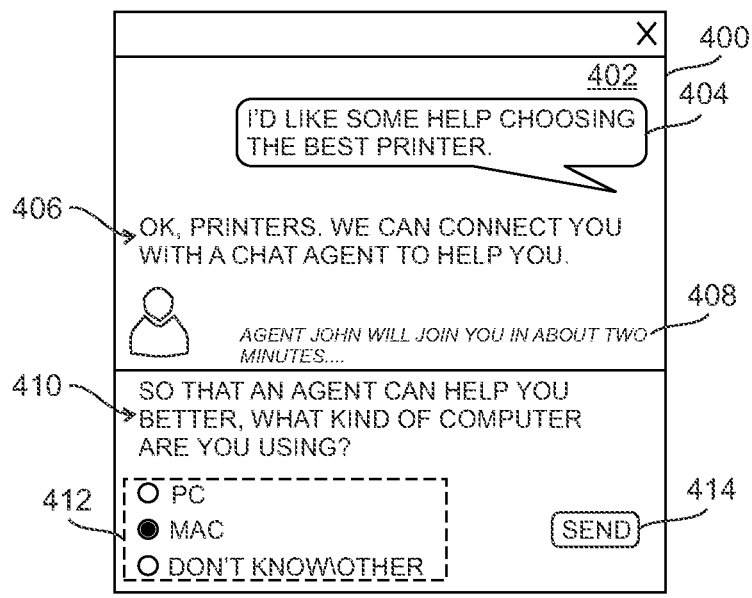
FIG. 4A shows an example screenshot of another chat console for illustrating a question corresponding to an interactive form being displayed to a customer, in accordance with an embodiment of the invention.

Referring now to FIG. 4A, an example screenshot of another chat console 400 is shown for illustrating a question corresponding to an interactive form being displayed to a customer, in accordance with an embodiment of the invention. The chat console 400 is similar in all aspects to the chat console 300 explained with reference to FIGS. 3A and 3F and is not explained herein. The chat console 400 is configured to present an UI 402 (similar to the UI 302) to facilitate a chat interaction between the customer and the agent. In an illustrative example, the interaction may progress till a free-form textual input 404 (similar to the free-form textual input 324 of FIG. 3B) is received from the customer. More specifically, the customer may provide the free-form textual input 404 requesting assistance for choosing a best printer. As a response, the system 200 may be caused to display an interactive form as explained with reference to FIGS. 3C to 3F to facilitate an acquiring of structured inputs from the customer.

In an example embodiment, the interactive form may be configured to inform the customer that a chat agent will assist the customer as exemplarily depicted by a text portion 406 'Ok printers. We can connect you with a chat agent to help you'. Further, the interactive form may display an indication of the amount of time by which the chat agent will be available for the interaction as exemplarily depicted by an indication 408 including text 'Agent John will join you in about two minutes'.

Thereafter, the UI 402 is depicted to display a question 410 along with multiple answer options 412 corresponding to the interactive form. The question 410 may include a preamble 'So that an agent can help you better' before the question 'what kind of computer are you using?' so as to provide a seamless transition from the indication 408 to the questions of the interactive form.

The question 410 and the multiple answer options 412 are similar to the question 326 and the multiple answer options 328 explained with reference to FIG. 3C, respectively, and are not explained herein. In an example embodiment, the customer may select the 'Mac' answer option from among the multiple answer options 412 by selecting the respective radio button and thereafter submit the answer selection by selecting a send option 414 displayed adjacent to the multiple answer options 412 on the UI 402.

Figure 4B:
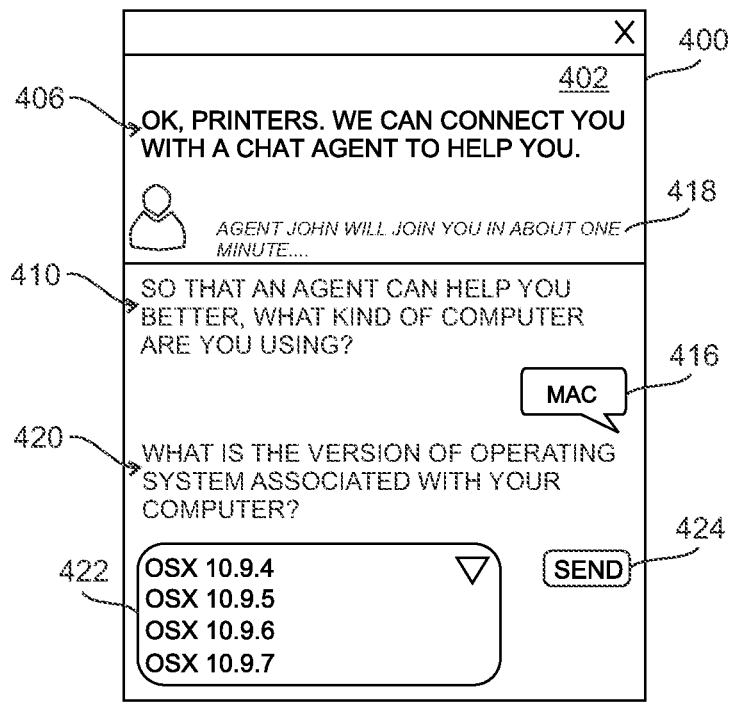
FIG. 4B shows an example screenshot of the chat console of FIG. 4A for illustrating a next question corresponding to an interactive form being displayed to a customer, in accordance with an embodiment of the invention.

Referring now to FIG. 4B, an example screenshot of the chat console 400 of FIG. 4A is shown for illustrating a next question corresponding to an interactive form being displayed to a customer, in accordance with an embodiment of the invention. The UI 402 of the chat console 400 as depicted in FIG. 4B presents the customer with the view in which he/she can see details of the currently ongoing turn-based interaction and which is continued from FIG. 4A. The selected answer option 'Mac', post submission is depicted in a bubble form as shown by a chat entry 416. The interactive form may now be configured to display another indication suggesting the amount of time remaining for interaction with a chat agent is one minute as exemplarily depicted by an indication 418 including text 'Agent John will join you in about one minute'.

Thereafter, the UI 402 is depicted to display a next question 420 along with multiple answer options 422 corresponding to the interactive form. The question 420 and the multiple answer options 422 are similar to the question 338 and the multiple answer options 340 explained with reference to FIG. 3E, respectively, and are not explained herein. In an example embodiment, the customer may select the 'OSX 10.9.4' answer option from the drop down list configuring the multiple answer options 422 and thereafter submit the answer option by selecting a send option 424 displayed adjacent to the drop down list on the UI 402. As explained with reference to FIGS. 3D to 3E, in some embodiments, one or more questions of the interactive form along with corresponding answer options may be slided out and displayed adjacent to the UI 402 displaying the turn-based interaction.

Figure 4C:
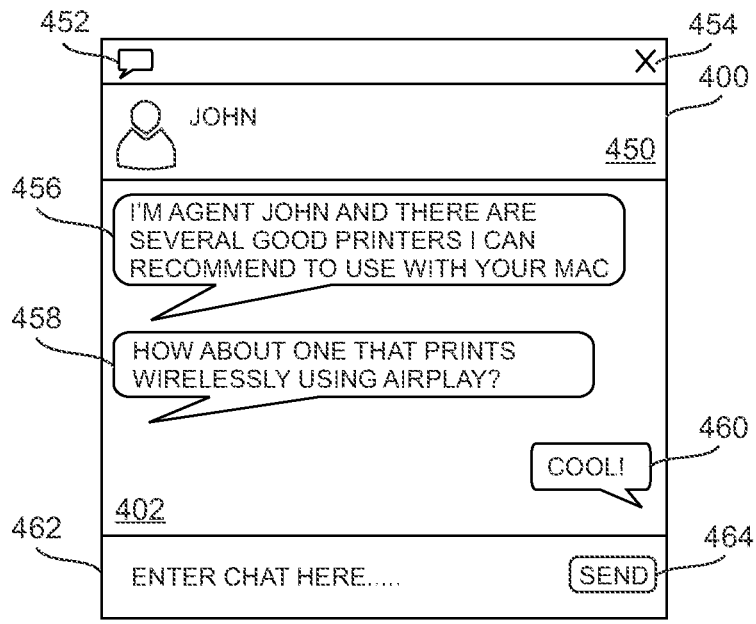
FIG. 4C shows an example screenshot of the chat console of FIG. 4A for illustrating an on-going chat interaction between a live agent and the customer, in accordance with an embodiment of the invention.

Referring now to FIG. 4C, an example screenshot of the chat console 400 of FIG. 4A is shown for illustrating an on-going chat interaction between a live agent and the customer, in accordance with an embodiment of the invention. The live agent is exemplarily depicted herein as Agent John. The UI 402 as depicted in FIG. 4C presents the customer with the view in which he/she can see details of the interaction currently ongoing between the customer and agent John and is continued from the interaction so far as depicted in FIG. 4B. More specifically, upon detecting availability of the agent John, the presentation of questions corresponding to the interactive form may be terminated and all the answers provided by the customer in response to the questions are provisioned to the agent John so that the customer may not need to answer the same questions. Based on the information gathered corresponding to the customer's requirement, the agent John may provide assistance to the customer. In at least one embodiment, the system 200 may be caused to generate one or more content portions relevant to the customer's requirement or identify a web link that the customer may find useful, and provision such information to the agent John who may then provide desired assistance to the customer.

In FIG. 4C, the chat console 400 is depicted to include a banner section 450, a chat icon 452 and an end chat option 454. In some embodiments, the banner section 450 may display agent identification information, such as 'agent name, agent identification (ID) number, agent's photo, and the like. It is understood that the agent John may be disposed at a remote geographical location from the customer's location and in at least some embodiments may be associated with a customer support facility of the enterprise.

The UI 402 is depicted to display conversational lines 456 and 458 from agent John stating 'I'm Agent John and there are several good printers I can recommend to use with your Mac' and a further enquiry 'How about one that prints wirelessly using AirPlay?', respectively. In an example scenario, the customer may provide a free-form reply 460 (depicted to be 'Cool!').

The customer may chat with the agent by typing text in an input box 462 and submitting the text by selecting a send option 464. In an embodiment, the interaction may be terminated at any moment by the customer by selecting an end chat option 456. In this manner, the system 200 may be caused to facilitate interaction with the customer and acquire structured inputs using the interactive form and further transfer the interaction to the agent to enable the customer to experience a personalized service. A method for acquiring structured inputs from customers in turn-based online interactions is explained with reference to FIG. 5.

Figure 5:
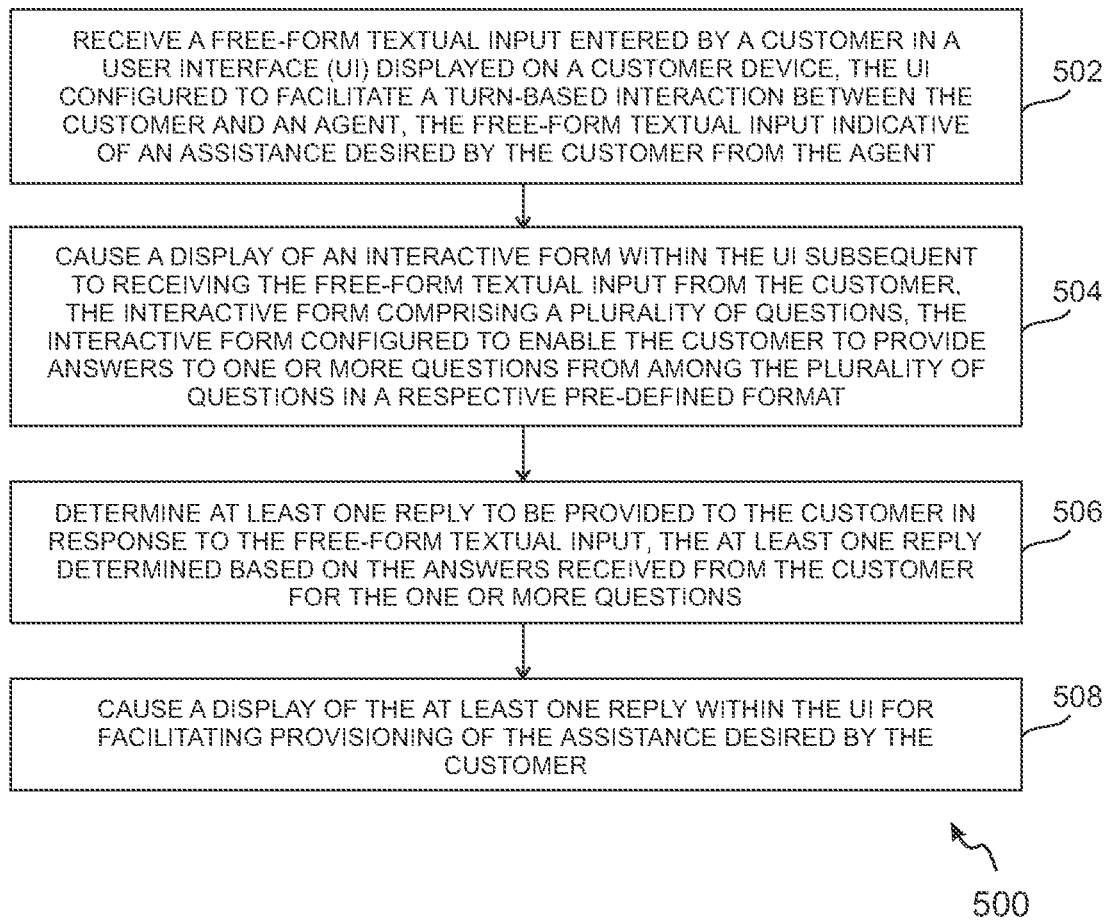
FIG. 5 is a flow diagram of an example method for acquiring structured inputs from a customer in a turn-based online interaction, in accordance with an embodiment of the invention.

FIG. 5 is a flow diagram of an example method 500 for acquiring structured inputs from a customer in a turn-based online interaction, in accordance with an embodiment of the invention. The method 500 depicted in the flow diagram may be executed by, for example, the system 200 explained with reference to FIGS. 2 to 4C. Operations of the flowchart, and combinations of operation in the flowchart, may be implemented by, for example, hardware, firmware, a processor, circuitry and/or a different device associated with the execution of software that includes one or more computer program instructions. The operations of the method 500 are described herein with help of the system 200. For example, one or more operations corresponding to the method 500 may be executed by a processor, such as the processor 202 of the system 200. It is noted that although the one or more operations are explained herein to be executed by the processor alone, it is understood that the processor is associated with a memory, such as the memory 204 of the system 200, which is configured to store machine executable instructions for facilitating the execution of the one or more operations. It is also noted that, the operations of the method 500 can be described and/or practiced by using a system other than the system 200. The method 500 starts at operation 502.

At operation 502 of the method 500, a free-form textual input entered by a customer in a user interface (UI) displayed on a customer device is received. The UI may be configured to facilitate a turn-based interaction between the customer and an agent. The free-form textual input is indicative of an assistance desired by the customer from the agent. As an illustrative example, a customer may wish to troubleshoot installation of new software on his Android Phone and accordingly provision free-form textual input 'My device is rebooting every few minutes after latest OS update. Please help' in the text entry section of the UI.

At operation 504 of the method 500, a display of an interactive form within the UI subsequent to receiving the free-form textual input from the customer. As explained with reference to FIG. 2, the free-form textual input may be parsed and analyzed to extract feature vectors/features therefrom. Further, each feature vector may be tagged with a customer intent based on past customer behaviour. A probability score may be computed for each intent and the intents may thereafter be ranked based on the corresponding probability scores. In some embodiments, a probability score of the maximum scoring intent may be compared with a pre-defined threshold value and if the probability score is greater than the predefined threshold value then further interaction of the customer may be customized based on the intent. In at least some example embodiments, the selection of the interactive form and one or more questions included therein may be performed based on the intent determined from such analysis of the free-form textual input. Further as explained with reference to FIGS. 3A to 3F, the interactive form includes a plurality of questions and is configured to enable the customer to provide answers to one or more questions in a respective pre-defined format. The display of interactive form including questions with multiple answer options, thereby eliciting structured inputs from the customer, may be performed as explained with reference to FIGS. 3C to 3F and is not explained again herein.

At operation 506 of the method 500, at least one reply to be provided to the customer in response to the free-form textual input is determined based on the answers received from the customer for the one or more questions. In an example embodiment, the reply may include a web link capable of directing the customer to a web page associated with content relevant to the assistance desired by the customer. Such a scenario is explained with reference to FIG. 3F. In an embodiment, the response may include text content informing the customer of a subsequent involvement of a live agent in assisting the customer with the desired assistance. At operation 508 of the method 500, a display of the at least one reply within the UI is caused for facilitating provisioning of the assistance desired by the customer.

In some embodiments, the system 200, either directly or by causing a virtual agent to interact with the customer, by means of the interactive form, receive information regarding the customer's requirement, till a live agent is available for interacting with the agent. In such a scenario, the interactive form is configured to present indications of an amount of time remaining for the live agent to be available for interacting with the customer at regular intervals as explained with reference to FIGS. 4A to 4C.

Without in any way limiting the scope, interpretation, or application of the claims appearing below, advantages of one or more of the exemplary embodiments disclosed herein facilitate in acquiring structured inputs from customers in turn-based interactions, such as chat interactions. The structured inputs are acquired by providing an interactive form to the customer. The interactive form is configured to enable the customers to clearly view input options and/or format in which input is expected, and to select answer options from a multiple answer format by either clicking on a drop down list or selecting a radio button rather than providing an open-ended free-form typed input. The options may further be selected easily using touch screen devices as more information fits a display screen as keyboard is not required in to answer many questions. Unlike web forms, the interactive form presents the appropriate next question to the user and shows them the expected format/options, while still being easy for the system to process. Moreover, the interactive form allows for the entries to be efficiently entered, validated, and submitted to the database in an expected format.

Furthermore, the techniques suggested herein leverage the conversational interaction model to provide the most appropriate next question. The interaction is continued in a same thread and the customer need not navigate to different pages and the customer may also view interaction history in same user interface. Such acquiring of structured inputs from the customer further enables the virtual assistant and/or the agent to provide different options that are optimized and personalized for the customer based on the inputs provided by the customer.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, as described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 200, the processor 202, the memory 204 and the I/O module 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIG. 5). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
receiving, by a processor, a free-form textual input entered by a customer in a user interface (UI) displayed on a customer device, the UI configured to facilitate a turn-based interaction between the customer and a virtual agent, the free-form textual input indicative of an assistance desired by the customer from the virtual agent;
parsing and analyzing the free-form textual input using statistical techniques, by said processor, to extract one or more features from said free-form textual input;
identifying one or more intents and tagging said intents with corresponding features extracted from said free-form textual input to associate with said extracted features, by said processor, one or more intents that are indicative of said assistance desired by the customer from the virtual agent;
identifying the customer and retrieving information related to the customer;
using said retrieved information to compute a probability score for each intent based upon feature vectors of the free-form text, as determined by:

$$A = p(I_i | X),$$

where $I_i$ is the $i^{th}$ intent I and X is the feature vector;
using one or more machine-learning algorithms to determine a probability of intent $I_i$ based on customer historical behavior;
ranking said intents in order of probability scores;

comparing a probability score of a maximum scoring intent with a pre-defined threshold value that is indicative of a probability of occurrence of an event;

wherein where the probability score of the maximum scoring intent is greater than the pre-defined threshold value, a further interaction with the customer is customized based on the intent; and wherein where the probability score of the maximum scoring intent is less than or equal to the pre-defined threshold value, customization of subsequent interaction is precluded and the subsequent interaction with the customer is conducted to learn more about the assistance desired by the customer;

based upon said one or more intents, causing, by the processor, a display of an interactive form within the UI subsequent to receiving the free-form textual input from the customer, the interactive form comprising a plurality of questions, the interactive form configured to receive structured inputs from said customer in said turn-based interaction in the form of structured answers to one or more questions from among the plurality of questions in a respective pre-defined format;

determining, by the processor, at least one reply to be provided to the customer in response to the free-form textual input, the at least one reply determined based on the structured answers received from the customer for the one or more questions; and causing, by the processor, a display of the at least one reply within the UI for facilitating provisioning of the assistance desired by the customer.

2. The method of claim 1, wherein the plurality of questions associated with the interactive form is displayed to the customer one-question at a time on the UI.

3. The method of claim 2, wherein a next question from among the plurality of questions is displayed on the UI based on the customer's answer to a question currently displayed on the UI.

4. The method of claim 1, wherein at least one question from among the plurality of questions is displayed along with respective multiple answer options and, wherein selection of an answer option enables the customer to provide an answer to a corresponding question in the respective pre-defined format.

5. The method of claim 4, wherein the multiple answer options configure a drop-down list.

6. The method of claim 4, wherein each answer option from among the multiple answer options is associated with a radio button capable of being selected by the customer to indicate a choice of the answer option as the answer to the corresponding question.

7. The method of claim 1, further comprising:
causing, by the processor, a display of a form field within the UI prior to receiving the free-form textual input from the customer, the form field capable of receiving a text entry corresponding to an identification information from the customer, the form field displaying a desired text entry format to the customer for assisting the customer to provide the text entry conforming to the desired text entry format.

8. The method of claim 1, wherein the interactive form is configured to provide at least one indication of an amount of time remaining for a live agent to be available for interacting with the customer.

9. The method of claim 1, wherein the at least one reply comprises a web link capable of directing the customer to a web page associated with content relevant to the assistance desired by the customer.

10. The method of claim 1, wherein the at least one reply is a text entry informing the customer of a subsequent involvement of a live agent in assisting the customer.

11. The method of claim 1, wherein each answer provided by the customer in response to a question from among the plurality of questions is subsequently displayed in a chat conversational form within the UI.

12. The method of claim 1, wherein the interactive form is capable of being slided out of the UI and displayed substantially adjacent to the UI.

13. A system, comprising:
at least one processor; and
a memory having stored therein machine executable instructions, that when executed by the at least one processor, cause the system to:
receive a free-form textual input entered by a customer in a user interface (UI) displayed on a customer device, the UI configured to facilitate a turn-based interaction between the customer and a virtual agent, the free-form textual input indicative of an assistance desired by the customer from the virtual agent;
parse and analyze the free-form textual input using statistical techniques to extract one or more features from said free-form textual input;
identify one or more intents and tag said intents with corresponding features extracted from said free-form textual input to associate with said extracted features one or more intents that are indicative of said assistance desired by the customer from the virtual agent;
identify the customer and retrieving information related to the customer;
use said retrieved information to compute a probability score for each intent based upon feature vectors of the free-form text, as determined by:

$$A=p(I_i|X),$$

where $I_i$ is the $i^{th}$ intent I and X is the feature vector;
using one or more machine-learning algorithms to determine a probability of intent $I_i$ based on customer historical behavior;
rank said intents in order of probability scores;
compare a probability score of a maximum scoring intent with a pre-defined threshold value that is indicative of a probability of occurrence of an event;
wherein where the probability score of the maximum scoring intent is greater than the pre-defined threshold value, a further interaction with the customer is customized based on the intent; and
wherein where the probability score of the maximum scoring intent is less than or equal to the pre-defined threshold value, customization of subsequent interaction is precluded and the subsequent interaction with the customer is conducted to learn more about the assistance desired by the customer;
based upon said one or more intents, display of an interactive form within the UI subsequent to receiving the free-form textual input from the customer, the interactive form comprising a plurality of questions, the interactive form configured to receive structured inputs from said customer in said turn-based interaction in the form of structured answers to one or more questions from among the plurality of questions in a respective pre-defined format;
determine at least one reply to be provided to the customer in response to the free-form textual input, the at least one reply determined based on the structured answers received from the customer for the one or more questions; and cause a display of the at least one reply within the UI for facilitating provisioning of the assistance desired by the customer.

14. The system of claim 13, wherein the plurality of questions associated with the interactive form is displayed to the customer one-question at a time on the UI.

15. The system of claim 14, wherein a next question from among the plurality of questions is displayed on the UI based on the customer's answer to a question currently displayed on the UI.

16. The system of claim 13, wherein at least one question from among the plurality of questions is displayed along with respective multiple answer options and, wherein selection of an answer option enables the customer to provide an answer to a corresponding question in the respective pre-defined format.

17. The system of claim 16, wherein the multiple answer options configure a drop-down list.

18. The system of claim 16, wherein each answer option from among the multiple answer options is associated with a radio button capable of being selected by the customer to indicate a choice of the answer option as the answer to the corresponding question.

19. The system of claim 13, wherein the system is further caused to:

facilitate a display of a form field within the UI prior to receiving the free-form textual input from the customer, the form field capable of receiving a text entry corresponding to an identification information from the customer, the form field displaying a desired text entry format to the customer for assisting the customer to provide the text entry conforming to the desired text entry format.

20. The system of claim 13, wherein the interactive form is configured to provide at least one indication of an amount of time remaining for a live agent to be available for interacting with the customer.

21. The system of claim 13, wherein the at least one reply comprises a web link capable of directing the customer to a web page associated with content relevant to the assistance desired by the customer.

22. The system of claim 13, wherein the at least one reply is a text entry informing the customer of a subsequent involvement of a live agent in assisting the customer.

23. The system of claim 13, wherein each answer provided by the customer in response to a question from among the plurality of questions is subsequently displayed in a chat conversational form within the UI.

24. The system of claim 13, wherein the interactive form is capable of being slid out of the UI and displayed substantially adjacent to the UI.

25. A non-transitory computer-readable medium storing a set of instructions that when executed cause a computer to perform a method comprising:

receiving a free-form textual input entered by a customer in a user interface (UI) displayed on a customer device, the UI configured to facilitate a turn-based interaction between the customer and a virtual agent, the free-form textual input indicative of an assistance desired by the customer from the virtual agent;

parsing and analyzing the free-form textual input using statistical techniques to extract one or more features from said free-form textual input;

identifying one or more intents and tagging said intents with corresponding features extracted from said free-form textual input to associate with said extracted features one or more intents that are indicative of said assistance desired by the customer from the virtual agent;

identifying the customer and retrieving information related to the customer;

using said retrieved information to compute a probability score for each intent based upon the feature vectors of the free-form text, as determined by:

$A = p(I_i|X)$, where $I_i$ is the $i^{th}$ intent I and X is the feature vector;

using one or more machine-learning algorithms to determine a probability of intent $I_i$ based on customer historical behavior;

ranking said intents in order of probability scores;

comparing a probability score of a maximum scoring intent with a pre-defined threshold value that is indicative of a probability of occurrence of an event;

wherein where the probability score of the maximum scoring intent is greater than the pre-defined threshold value, a further interaction with the customer is customized based on the intent; and wherein where the probability score of the maximum scoring intent is less than or equal to the pre-defined threshold value, customization of subsequent interaction is precluded and the subsequent interaction with the customer is conducted to learn more about the assistance desired by the customer;

based upon said one or more intents, causing a display of an interactive form within the UI subsequent to receiving the free-form textual input from the customer, the interactive form comprising a plurality of questions, the interactive form configured to receive structured inputs from said customer in said turn-based interaction in the form of structured answers to one or more questions from among the plurality of questions in a respective pre-defined format;

determining at least one reply to be provided to the customer in response to the free-form textual input, the at least one reply determined based on the structured answers received from the customer for the one or more questions; and causing a display of the at least one reply within the UI for facilitating provisioning of the assistance desired by the customer.

26. The computer-readable medium of claim 25, wherein the plurality of questions associated with the interactive form is displayed to the customer one-question at a time on the UI, and, wherein a next question is displayed on the UI based on the customer's answer to a question currently displayed on the UI.

27. The computer-readable medium of claim 25, wherein at least one question from among the plurality of questions is displayed along with respective multiple answer options and, wherein selection of an answer option enables the customer to provide an answer to a corresponding question in the respective pre-defined format.

28. The computer-readable medium of claim 27, wherein the multiple answer options configure a drop-down list.

29. The computer-readable medium of claim 27, wherein each answer option from among the multiple answer options is associated with a radio button capable of being selected by the customer to indicate a choice of the answer option as the answer to the corresponding question.

30. The computer-readable medium of claim 25, wherein the method further comprises:
   causing a display of a form field within the UI prior to receiving the free-form textual input from the customer, the form field capable of receiving a text entry corresponding to an identification information from the customer, the form field displaying a desired text entry format to the customer for assisting the customer to provide the text entry conforming to the desired text entry format.

31. The computer-readable medium of claim 25, wherein the interactive form is configured to provide at least one indication of an amount of time remaining for a live agent to be available for interacting with the customer.

32. The computer-readable medium of claim 25, wherein the at least one reply comprises a web link capable of directing the customer to a web page associated with content relevant to the assistance desired by the customer.

33. The computer-readable medium of claim 25, wherein the at least one reply is a text entry informing the customer of a subsequent involvement of a live agent in assisting the customer.

34. The computer-readable medium of claim 25, wherein the interactive form is capable of being slided out of the UI and displayed substantially adjacent to the UI.

* * * * *